United States Patent [19]
Rainey

[11] 3,823,756
[45] July 16, 1974

[54] MOUNTING HEAD FOR A TIRE TOOL
[75] Inventor: Donald B. Rainey, Hamilton, Ohio
[73] Assignee: Magnum Automotive Equipment, Inc., Cincinnati, Ohio
[22] Filed: Jan. 30, 1973
[21] Appl. No.: 328,010

[52] U.S. Cl. ................................. 157/1.3, 157/1.22
[51] Int. Cl. ............................................ B60c 25/04
[58] Field of Search ..................... 157/1.22, 1.24, 1.3

[56] References Cited
UNITED STATES PATENTS
| | | | |
|---|---|---|---|
| 2,850,061 | 9/1958 | Twiford | 157/1.24 |
| 3,100,011 | 8/1963 | Lydle | 157/1.22 |
| 3,247,883 | 4/1966 | Strang et al. | 157/1.22 |

FOREIGN PATENTS OR APPLICATIONS
| | | | |
|---|---|---|---|
| 121,296 | 12/1919 | Great Britain | 157/1.22 |

Primary Examiner—Othell M. Simpson
Assistant Examiner—Harold P. Smith, Jr.
Attorney, Agent, or Firm—Wood, Herron & Evans

[57] ABSTRACT

An improved mounting head for a tire tool, the mounting head being adapted for either clockwise or counterclockwise rotation (on either an automatic or manual tire changing machine) as desired by the operator. The mounting head is characterized by a forehead that is curved on its leading surface and that extends upward and forward, and a lip that is curved downward and rearward, the forehead and the lip merging together at a mouth. The curvature axis of the lip (which lies parallel to the tool's $x$ plane) is tranversely disposed relative to the curvature axis of the forehead (which lies in the tool's $Y$ plane). The forehead and lip are further characterized by being fully symmetrical about the $Y$ plane, the tool's $x$ and $Y$ planes being at right angles one to the other.

4 Claims, 5 Drawing Figures

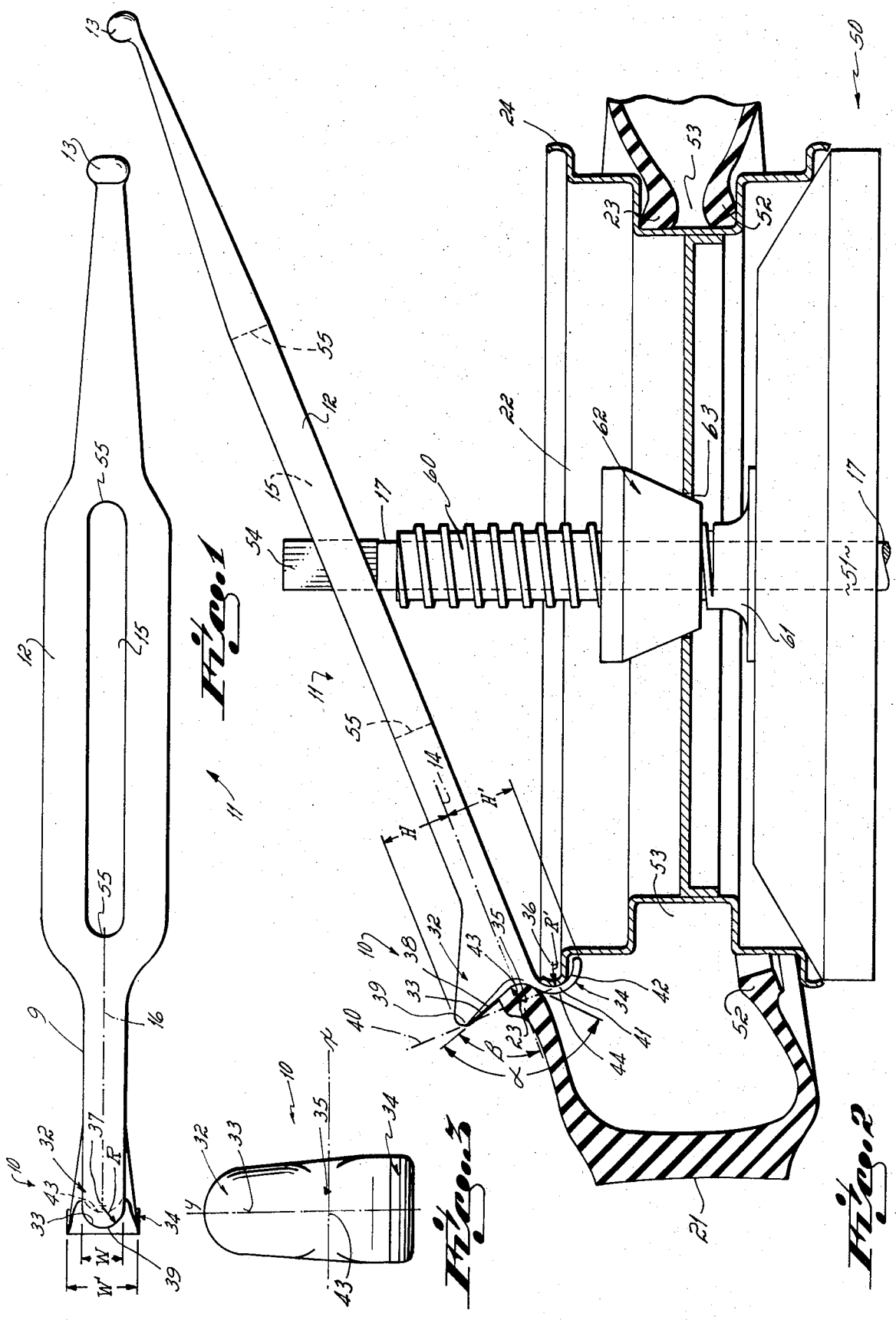

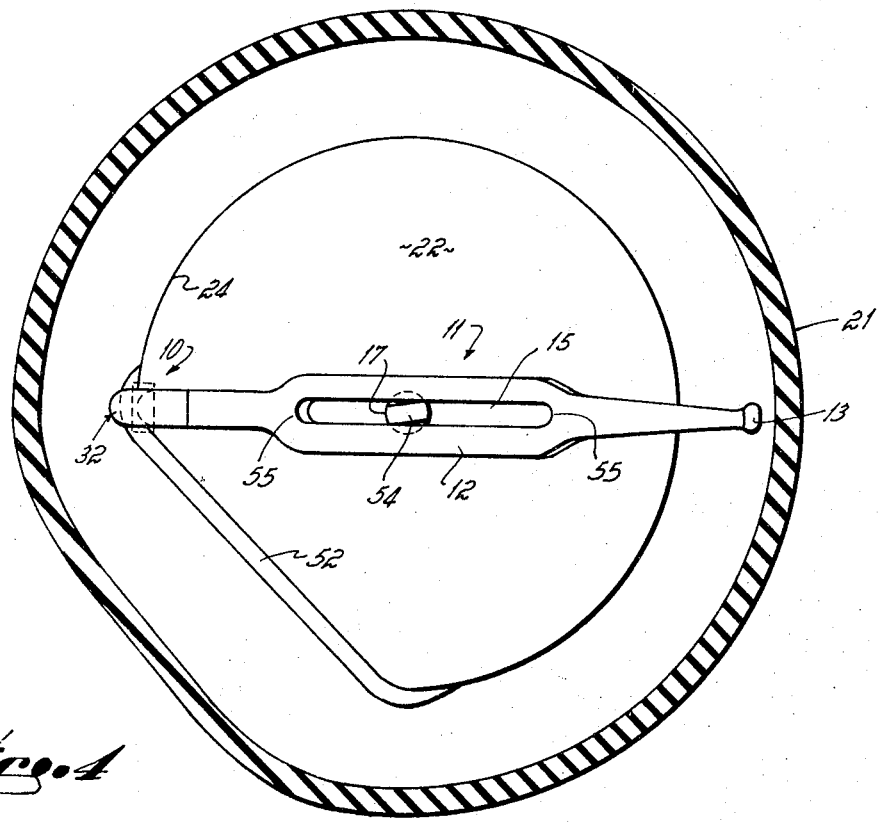
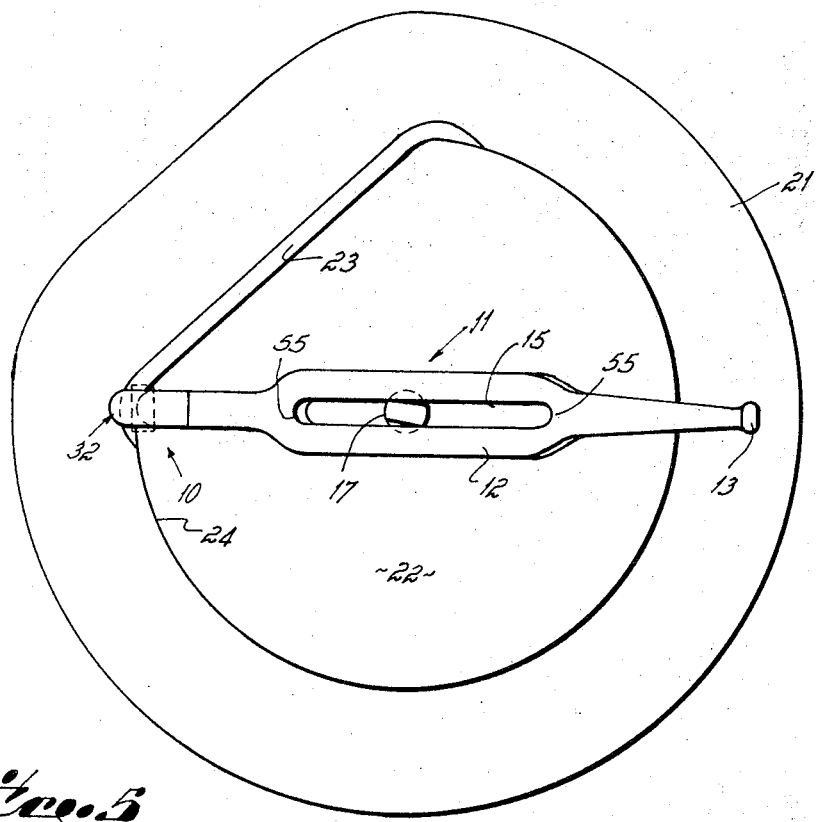

MOUNTING HEAD FOR A TIRE TOOL

This invention relates to a tire tool adapted to mount pneumatic tires on wheels. More particularly, this invention relates to an improved mounting head for a tire tool, the tool being adapted for use with either an automatic or a manual tire changing machine.

The mounting of a pneumatic tire on a wheel used to be totally done by hand. Such provided major problems for an operator in that the tire's beads are relatively inflexible, and that the beads must be somehow stretched over the wheel's rim so as to positively locate the tire on the wheel.

In mounting a pneumatic tire on a wheel, the tire's two beads can be located between the wheel's rims only because of the wheel's drop center or well configuration. These two beads are, of course, located between the wheel's rim one at a time. During mounting of the first bead the wheel's drop center configuration allows the tire to be moved laterally to a slight extent from one side of the wheel to the other (the first bead dropping into the wheel's well as the tire is so moved) as the first bead is located over the wheel's rim and, hence, on the wheel. Mounting of the second bead on the wheel and, hence, final mounting of the tire on the wheel, is carried out in a similar manner. The function of a tire tool's mounting head is, basically, to stretch the beads of the tire over a wheel's rim so as to locate the tire on the wheel prior to filling the tire with the desired air pressure. That is, the mounting head of a tire tool is used as an aid in positioning a tire's beads (and, hence the tire itself) on a wheel.

Over the years, a number of different types of tire changing machines have been developed which provide means (including a tire tool having a mounting head) to mechanically assist an operator in mounting a tire on a wheel. Most such tire changing machines include a horizontally disposed table on which the tire/wheel is supported, the wheel being horizontally disposed on and clamped to the table. A vertical centerpost extends centrally upward from the stationery table, the centerpost extending up through the wheel's center when the wheel is clamped to the table. The tire tool (the mounting head of which cooperates with the wheel's rim and the tire's bead to aid in locating the bead within the wheel's well) is then cooperatively engaged with the centerpost. The tire tool extends outward from the centerpost in a radial fashion, the centerpost in effect providing a rotational axis about which the tire tool is rotated as the tool's mounting head is worked around a tire's bead to locate that bead over the wheel's rim. Such tire changer machines may be automatic (in such instances the tire tool is power driven or rotated by the centerpost itself), or such tire changer machines may be manual (in such instances the tire tool is pushed or rotated manually with the centerpost serving as a vertical fulcrum).

There are a number of different mounting heads for tire tools that are known to the tire art. However, and generally speaking, such tire tool mounting heads are adapted to rotate in one direction only relative to the table of the tire changing machine. That is, prior art tire tools generally are adapted to rotate only clockwise or counterclockwise, but not both, about the machine's centerpost.

When used on an automatic tire changing machine, oftentimes such one-way prior art mounting heads become bound or hung up or jammed between the tire's bead and the wheel's rim; this occurs because of the undercapacity of the machine's power drive under such high load conditions. Common operator practice to overcome this binding problem on an automatic machine involves the step of beating on the tire tool with a mallet or hammer to aid the tool in completing its singular revolution around the wheel and, hence, mounting of the tire's bead on the wheel. Needless to say, such a practice results in major abuse to the tool and to the tire, as well as to the centerpost drive mechanism of the automatic tire changer machine.

Further, and when used on an automatic tire changer machine, a tire tool having a one-way mounting head must be returned to a home or standard position after each bead mounting cycle. That is, the tool's mounting head must be returned to its home position from its fully rotated position after one of a tire's beads have been mounted over a wheel's rim before the other of the tire's beads can be mounted. This, of course, causes a time delay during the bead mounting operation and makes the machine less than 100 percent efficient.

When used on a manual tire changer machine, such one-way prior art mounting heads may well provide use problems for a left-handed operator. This for the reason that, generally speaking, the mounting heads of prior art tire tools are designed for use by a right-handed operator. This means that a left-handed operator must learn to rotate the tool, as it is used to mount a tire's bead over a wheel's rim, in a rotational direction contrary to his dexterity. A right-handed operator generally finds it easiest to rotate the tool's mounting head in a clockwise direction as the machine's wheel support table is viewed from above. On the other hand, a left-handed operator generally finds it easiest to rotate the tool's mounting head in a counterclockwise direction.

It has been one objective of this invention to provide a mounting tool for a tire changing machine, whether of the automatic or manual type, that can be rotated in either of a clockwise or a counterclockwise direction, thereby solving the jamming or binding problems which arise in automatically operated tire changer machines, and the dexterity problems which arise in manually operated tire changer machines.

It has been another objective of this invention to provide a mounting tool for a tire changing machine that can be rotated in both the clockwise and counterclockwise directions, allowing a tire's first bead to be mounted over the wheel's rim while the tool is rotated in one direction and the tire's second bead to be mounted while the tool is rotated in the reverse direction, i.e., thereby eliminating the necessity of returning the tool to a single home position prior to mounting a tire's bead on a wheel's rim.

These objectives have been obtained in this invention by providing an improved mounting head for a tire tool, the mounting head being adapted for either clockwise or counterclockwise rotation (on either an automatic or manual tire changing machine) as desired by the operator. The mounting head is characterized by a forehead that is curved on its leading surface and that extends upward and forward, and a lip that is curved downward and rearward, the forehead and the lip merging together at a mouth. The curvature axis of the lip (which lies parallel to the tool's $x$ plane) is transversely disposed relative to the curvature axis of the forehead (which lies in the tool's y plane). The forehead and lip are further characterized by being fully symmetrical about the y plane, the tool's x and y planes being at right angles one to the other.

When viewed from the side, the mouth defines an included angle of about 115°, and the forehead's leading edge defines an angle with the tool's x plane of about 75°. Further, when viewed from the side and when the tool's x plane is horizontally disposed, the leading point on the forehead is in the same vertical plane as the leading point on the lip's inner surface, and the innermost point of the mouth is disposed rearwardly of that same vertical plane.

As measured at their widest points when viewed from a line of sight transverse to the x plane, the width of the forehead is preferably about three-fifths the width of the lip. As measured at their highest points when viewed from a line of sight transverse to the y plane, and when measured relative to the mouth's centerline, the height of the forehead is preferably about equal to the height of the lip. The radius of the forehead's curvature is preferably about the same as the radius of the lip's curvature.

Other objectives and advantages of this invention will be more apparent from the following detailed description taken in conjunction with the drawings in which:

FIG. 1 is a top view illustrating the improved mounting head for a tire tool in accordance with the principles of this invention;

FIG. 2 is a side elevational view illustrating the tire tool shown in FIG. 1 in operational position;

FIG. 3 is a front elevational view of the improved mounting head of this tire tool;

FIG. 4 is a top view, partially in cross section, illustrating the tool in counterclockwise rotation as same operates to locate a tire's first bead on a wheel; and FIG. 5 is a top view similar to FIG. 3 but showing clockwise rotational mounting to locate a tire's second bead on a wheel.

The improved mounting head 10 for a tire tool 11 of this invention is shown in the figures. As is shown in FIGS. 1 and 2, the mount/demount or tire tool 11 includes the mounting head 10, a body section 12, and a demounting head 13 (the demounting head per se forming no part of this invention). The tool's body section 12 is planar in configuration and is located in the tool's x plane 14, the mounting head 10 extending from one end of the body section and the demounting head 13 extending from the other end of the body section.

The body section 12 defines an elongated slot 15 that is located in the tool's y plane 16, the body section/slot structure being adapted for use with the tire changer machine's centerpost 17 as shown in FIGS. 2, 4 and 5, and as described below. Note the elongated slot 15 is symmetrically oriented lengthwise about the vertical y plane, and the improved mounting head is also symmetrically oriented relative to the vertical y plane, see FIG. 1. Therefore, the vertical y plane is, in essence, the dividing plane which separates the tool's body section and mounting head into two symmetrical half sections. To aid in describing the tool's mounting head 10, and as shown in FIGS. 1 and 2, reference is made throughout to the vertical or y plane 16 (see FIGS. 1 and 3) and the horizontal or x plane 14 (see FIGS. 2 and 3).

The demounting head 13 of the tool 11 is ball-shaped in configuration, and is a structure well known in the art. The function of the ball-shaped demounting head 13 is to aid in demounting a tire 21 from a wheel 22 when it is desired to remove the tire from the wheel. During demounting, and after the beads 23 of the tire have been broken away from the wheel's rim 24, the tool's demounting head is inserted between each bead and the wheel's rim (one bead at a time) so as to grab the bead and lift it over the rim as the tool is rotated about the centerpost's axis. This function is well known to the art.

As shown in FIGS. 1 and 2, the tool's improved mounting head 10 is interconnected with the tool's body portion 12 by means of a throat-like section 9. The mounting head 10 itself is characterized by a forehead 32 that is curved on its leading surface 33 and that extends upward and forward (relative to the body section 12), and a lip 34 that is curved downward and rearward (relative to the body section), the forehead and lip merging together at a mouth 35. The curvature axis 36 of the lip 34 (which lies parallel to the tool's x plane 14) is transversely disposed relative to the curvature axis 37 of the forehead 32 (which lies in the tool's y plane 16). The forehead 32 and lip 34 are further characterized by being fully symmetrical about the y plane 16, the tool's x 14 and y 16 planes being at right angles one to the other. In this regard, note that the forehead's curvature axis 37 is in the y plane 16.

When viewed from the side (see FIG. 2), the mouth 35 defines an included angle (alpha) of about 115° and the foreheads's leading edge 38 defines an angle (beta) with the tool's x plane 14 of about 75°. Further, when viewed from the side and when the tool's x plane 14 is horizontally disposed (see FIG. 2), the leading point 39 on the forehead 32 is in the same vertical plane 40 as the leading point 41 on the lip's inner surface 42, and the innermost point 43 of the mouth is disposed rearwardly of that same vertical plane 40.

As measured at their widest points when viewed from a line of sight transverse to the x plane 14 (see FIG. 1), the width W of the forehead 32 is preferably about three-fifths the width W' of the lip. This is because the curved lip 34 flares outwardly and away from the forehead 32 as it approaches its forwardmost edge 44. As measured at their highest points when viewed from a line of sight transverse to the y plane 16, and when measured relative to the mouth's centerline (which is the same as x plane 14 as shown in FIG. 2), the height H of the forehead is preferably about equal to the height H' of the lip. The radius R of the forehead's curfature 33 is preferably about the same as the radius R' of the lip's curvature 42.

The geometric configuration of the forehead 32 and the lip 34 of the mounting head, in combination with the size relationships of the forehead and lip, cooperate to provide a mounting head that is quite efficient in achieving its functional objectives during use by an operator. That is these characteristic features of the mounting head 10 for the tire tool 11 of this invention allow the mounting head to aid, in an efficient and easy manner, the mounting of a pneumatic tire 21 on a wheel 22.

The tire tool 11 is shown in combination with an automatic tire changing machine 50 in FIGS. 2 and 5. An automatic tire changing machine is more particularly described in U.S. Pat. application Ser. No. 328,008, entitled UPPER BEAD BREAKER MECHANISM, invented by William G. Brosene, Jr., and David W. Besuden, filed simultaneously herewith and U.S. Pat. application Ser. No. 328,017 entitled BEAD BREAKER MECHANISM, invented by John T. Curtis also filed simultaneously herewith. A mechanism for mechanically rotating the machine's centerpost 17 is more particularly set out in U.S. Pat. application Ser. No. 328,016 entitled CENTERPOST DRIVE MECHANISM, invented by William G. Brosene, Jr., also filed simultaneously herewith.

As shown in FIG. 2, the automatic tire changer machine 50 includes a horizontally disposed table 51. A threaded cylinder 60 is fixed to the table 51 through collar 61; a hold-down cone 62 being threaded onto that cylinder. The wheel 22 is clamped or held in fixed location on the table 51 by the hold-down cone 62. The centerpost 17 extends from below the table 51 up through the threaded cylinder 60 (and, hence, through the wheel's center hole 63). The centerpost 17 is rotatable relative to the fixed threaded cylinder 60 and is so rotated by means (not shown) beneath the table 51.

Use of the improved mounting head 10 is particularly illustrated in FIGS. 2, 4 and 5. Counterclockwise rotation of the tool's mounting head for mounting the tire on the wheel is illustrated in FIG. 4, and clockwise rotation of the tool's mounting head for the same purpose is illustrated in FIG. 5.

In use, the pneumatic tire 21 is first laid on top the wheel so that the first bead 52 lies in a horizontal plane adjacent the wheel's top rim 24. A portion or arcuate segment of the top bead 52 is then slipped over the wheel's rim 24, the tire 21 being moved slightly in a lateral direction to allow this step, thereby providing a starting location for the mounting head 10 of the tool 11. The mount/demount tool 11 is then interengaged with the automatically rotated centerpost 17 of the tire changer machine 50, the post's flatted top 54 cooperating with the tool's slot 15 so that the centerpost is drivingly engaged with the tire tool 11. Because of the elongated slot 16, the tool's improved mounting head 10 may be located so that its mouth 35 is adjacent the wheel's rim 24, and so that the head's lip 34 overlies the outer periphery of the wheel's rim, no matter what the diameter of the wheel, all as shown in FIG. 2. Thus, the tool's mounting head 10 may be radially positioned relative to the machine's centerpost 17 at any desired location within the limits defined by ends 55 of the slot 15.

As the tool 11 is slipped over the machine's centerpost 17, the mounting head's lip 34 is interengaged with rim 24 of the wheel 22 so that the wheel's rim is interposed between the lip and the centerpost, see FIG. 2. In this attitude the tire's first bead 52 is cradled in the mounting head's mouth 35, see FIG. 4. The centerpost 17 is then mechanically rotated counterclockwise as shown in FIG. 4, the mounting head's forehead 32, lip 34 and mouth 35 being maintained in correct radial relation relative to the centerpost because of lip 34 overlying the wheel's rim 24. As the mounting head 10 is rotated, and because the tire's bead 52 is cradled in the mouth 35 (and cannot escape therefrom due to the forward angularity of the mounting head's forehead 32), the bead 52 is forced down over mounting head's lip 34 and, hence, over the wheel's rim 24, until the entire bead 52 is located between the wheel's opposed rims in fully mounted position.

In similar fashion, and after the first bead 52 has been seated between the wheel's rims 24, the tool's mounting head 10 may be mechanically rotated clockwise as shown in FIG. 5 to mount the second bead 23 between the wheel's rims, too.

It now will be apparent that this counterclockwise or clockwise rotational characteristic is quite useful. In an automatic tire changer machine 50 such is important because, and for example with reference to FIG. 4, if the tool's mounting head 10 becomes jammed or bound or hung up between the tire's bead 52 and the wheel's rim 24 due to excessive frictional forces developed at the mounting head's mouth 35 between the mouth and the bead, then the rotational direction of the tool's mounting head can simply be mechanically reversed to relieve such binding or hanging up. Thereafter, the tire's bead 52 is rearranged relative to the wheel's rim and well 53, and the tool's mounting head 10 then rotated in the counterclockwise direction to finish mounting of the tire's bead 52 on the wheel 22. Of course, that problem may also arise in the automatic tire changer machine when the tool is being rotated in the clockwise direction; in this instance the mounting head's rotational direction is simply reversed to the counterclockwise direction to relieve such hanging up or binding. The clockwise and counterclockwise characteristic is also useful because it allows the tire's first bead 52 to be mounted, by e.g., clockwise rotation of the mounting head and the tire's second bead 23 to be mounted immediately thereafter by counterclockwise rotation of the mounting head without requiring that the mounting head be returned to a home or starting position prior to beginning its counterclockwise rotation.

In manual tire changing machines, i.e., in a machine where the centerpost is not being rotated by motor means, the clockwise or counterclockwise rotational characteristics of the mounting head is also quite important. This for the reason that a right-handed operator would generally wish to rotate the tool clockwise as illustrated in FIG. 5 when mounting a tire onto a wheel, and a left-handed operator would usually desire to rotate the tool counterclockwise as shown in FIG. 4 when mounting a tire onto the wheel. The mounting head of this invention, therefore, is not tailored to either right-handed or left-handed operation, it being adapted to use in both directions of rotation.

Having described in detail the preferred embodiment of my invention, what I desire to claim and protect by Letters Patent is:

1. A tire tool for a tire changing machine of the type having a rotatable centerpost vertically disposed relative to a tire support table, said tire tool comprising
   a. a mounting head that includes
      a forehead that is curved on its leading surface and that extends upward and forward,
      a lip that is curved downward and rearward, the forehead and the lip merging together at a mouth, and the radius of the forehead's curvature being about the same as the radius of the lip's curvature,
      the leading point on the lip's inner surface being in a vertical plane, the leading point on said forehead extending at least to said vertical plane, and the innermost point of said mouth being disposed rearwardly of said vertical plane, when viewed from the side and when the tool's $x$ plane is horizontally disposed, and the curvature axis of the lip lying parallel to the tool's $x$ plane and the curvature axis of the forehead lying in the tool's $y$ plane, the curvature axis of the lip being transversely disposed relative to the curvature axis of the forehead, the tool's $x$ and $y$ planes being at right angles one to the other, and the forehead and lip being fully symmetrical about the $y$ plane, said mounting head thereby being adapted to mount a tire's bead over a wheel's rim in either the clockwise or counterclockwise direction as desired by the operator and being adapted to withdrawal from the bead/rim interface when jammed therebetween, b. an elongated body portion integral with said mounting head, said body portion being in the tool's $x$ plane, and c. slot means formed in said body portion, said slot means being engageable about said centerpost such that said tool's $x$ axis is disposed at an acute angle relative to said table when said tool is operationally engaged with said centerpost.

2. An improved mounting head as set forth in claim 1 wherein said mouth defines an included angle of about 115° when viewed from the side.

3. An improved mounting head as set forth in claim 2 wherein said forehead's leading edge defines an angle with the tool's $x$ plane of about 75° when viewed from the side.

4. An improved mounting head as set forth in claim 1 wherein the width of said forehead is about three-fifths the width of said lip as measured at the widest points when viewed from the line of sight transverse to the $z$ plane, and wherein the height of said forehead is about equal to the height of said lip when measured relative to the mouth's center line and as measured at the highest points when viewed from a line of sight transverse to $y$ plane.

* * * * *